United States Patent [19]

Harmuth

[11] Patent Number: 5,057,846

[45] Date of Patent: Oct. 15, 1991

[54] EFFICIENT OPERATION OF PROBING RADAR IN ABSORBING MEDIA

[75] Inventor: Henning F. Harmuth, Sydney, Australia

[73] Assignee: Geophysical Survey Systems, Inc., North Salem, N.H.

[21] Appl. No.: 498,857

[22] Filed: Mar. 26, 1990

[51] Int. Cl.$^5$ .............................................. G01S 13/10
[52] U.S. Cl. ..................................... 342/204; 342/22; 342/13
[58] Field of Search ............................. 342/204, 22, 13

[56] References Cited

U.S. PATENT DOCUMENTS

| | | | |
|---|---|---|---|
| 3,736,589 | 5/1973 | Rambo | 342/204 |
| 3,945,010 | 3/1976 | Wardrop | 342/194 |
| 4,047,171 | 9/1977 | Fugit | 342/51 |
| 4,095,225 | 6/1978 | Grikmats | 342/195 |
| 4,167,737 | 9/1979 | Freedman | 342/201 |
| 4,328,495 | 5/1982 | Thue | 342/109 |
| 4,353,067 | 10/1982 | Mims | 342/201 |
| 4,513,288 | 4/1985 | Weathers et al. | 342/201 |
| 4,651,152 | 3/1987 | Harmuth | 342/13 |
| 4,661,819 | 4/1987 | Lewis | 342/201 |
| 4,709,237 | 11/1987 | Poullain et al. | 342/203 |
| 4,885,590 | 12/1989 | Hasan | 342/196 |
| 4,907,001 | 3/1990 | Harmuth | 342/159 |

OTHER PUBLICATIONS

Boules, Raouf N., "Propagation Velocity of Electromagnetic Signals in Lossy Media in the Presence of Noise", PhD Thesis, Department of Electrical Engineering, The Catholic University of America, Washington, D.C. 20064, 1989.

Primary Examiner—John B. Sotomayor
Attorney, Agent, or Firm—Wolf, Greenfield & Sacks

[57] ABSTRACT

A ground (or similar)—probing radar system in which the signal radiation is interrupted for short intervals. Reception is possible during these intervals and the dead range is virtually eliminated.

10 Claims, 3 Drawing Sheets (a)

(b)

EFFICIENT OPERATION OF PROBING RADAR IN ABSORBING MEDIA

FIELD OF THE INVENTION

This invention relates to the field of media probing and, more particularly, to the use of radar for probing media such as soil and rock.

BACKGROUND

A conventional radar radiates a pulse or a sequence of pulses of duration T and observes any returned signals arriving after the time T. This implies that there is a dead range D=cT/2 (where "c" is the velocity of propagation of the pulses in the medium) around the radar in which nothing can be observed. This dead range is usually not of much consequence. For instance, for T=1 μs we get D=150 m, which is much too short a range to be of concern if flying airplanes are observed. For a taxi radar one wants a shorter dead range, say 15 m, but in this case one wants shorter pulses too in order to get a better range resolution, and the dead range becomes unimportant. The situation is very different for probing radars that have to penetrate highly absorbing media like wet soil, water with dissolved minerals, or hot or molten rock. Very long pulses are required to penetrate such materials and get returned signals with sufficient energy. The dead range becomes a serious problem in this case.

Conventional radar obtains the distance of a target by measuring the round-trip time of an electromagnetic pulse reflected or backscattered by a target. The time diagram of FIG. 1 shows the radiated pulse or pulse sequence 10. Usually this pulse or pulse sequence is used to modulate a sinusoidal carrier, but this modulation is of no interest here and is actually avoided in ultra-wideband radar. Also shown is a returned pulse 12. Neither time nor amplitude are drawn to scale in FIG. 1; the amplitude of the returned pulse is many orders of magnitude less than the amplitude of the radiated pulse and the time ΔT at which the returned pulse is received is usually at least one order of magnitude larger than the pulse duration T.

During the interval of radiation 0<t<T the receiver input is blocked by the radiated signal. Some time is needed for the receiver to recover from this saturation blockage, which creates the dead zone 0<t<T' shown in FIG. 1, and the resulting observable range T'≦t≦$T_{max}$, where $T_{max}$ is the maximum range for the system. In terms of distance, the dead zone has the length D=cT'/2, where c is the velocity of light, c=1/$\sqrt{\epsilon\mu}$, in a loss-free medium, ε being the permittivity of the medium and μ being the permeability of the medium.

In a medium with large losses, long pulses or long sequences of pulses must be used to obtain a return signal without having to radiate a pulse with unrealistically large energy. What happens in this case is shown by FIG. 2. A rectangular pulse 14 with amplitude $E_0$ and duration T=71.4 ms is radiated through sea water. (This example is chosen because it was calculated in considerable detail in the doctoral thesis of R. N. Boules, "Propagation Velocity of Electromagnetic Signals in Lossy Media in the Presence of Noise", Department of Electrical Engineering, Catholic University of America, Washington, D.C. 20064). If this signal propagates 1.1 km, it is distorted to the pulse 16 with peak amplitude of about 0.5$E_0$ shown in FIG. 2. If the receiver cannot operate during the time 0<t<71.4 ms, only the part of the distorted pulse for t>71.4 ms is available for use. But this part contains only about half the energy of the whole distorted pulse, as is quite evident from FIG. 2. In order to make use of all of the energy of the distorted pulse, one must find a way to receive it during the time 0<t<T, with T=71.4 ms in FIG. 2, when the transmitter is radiating.

Accordingly, it is an object of the invention to provide an improved technique for probing absorbing media.

SUMMARY OF THE INVENTION

The foregoing and other objects are achieved by a ground (or similar)—probing radar system in which the signal radiation is interrupted for short intervals. Reception is possible during these intervals and the dead range is virtually eliminated.

The invention will be better understood from the detailed description below, which should be read in conjunction with the accompanying drawing.

BRIEF DESCRIPTION OF THE DRAWING

In the drawing,

FIG. 5, part (b) is a time diagram showing an extension of the principle of using gaps during radiation of a sequence of pulses, where the pulses in the sequence comprise the Barker code of FIG. 5, part (a).

DETAILED DESCRIPTION

Figure 2:
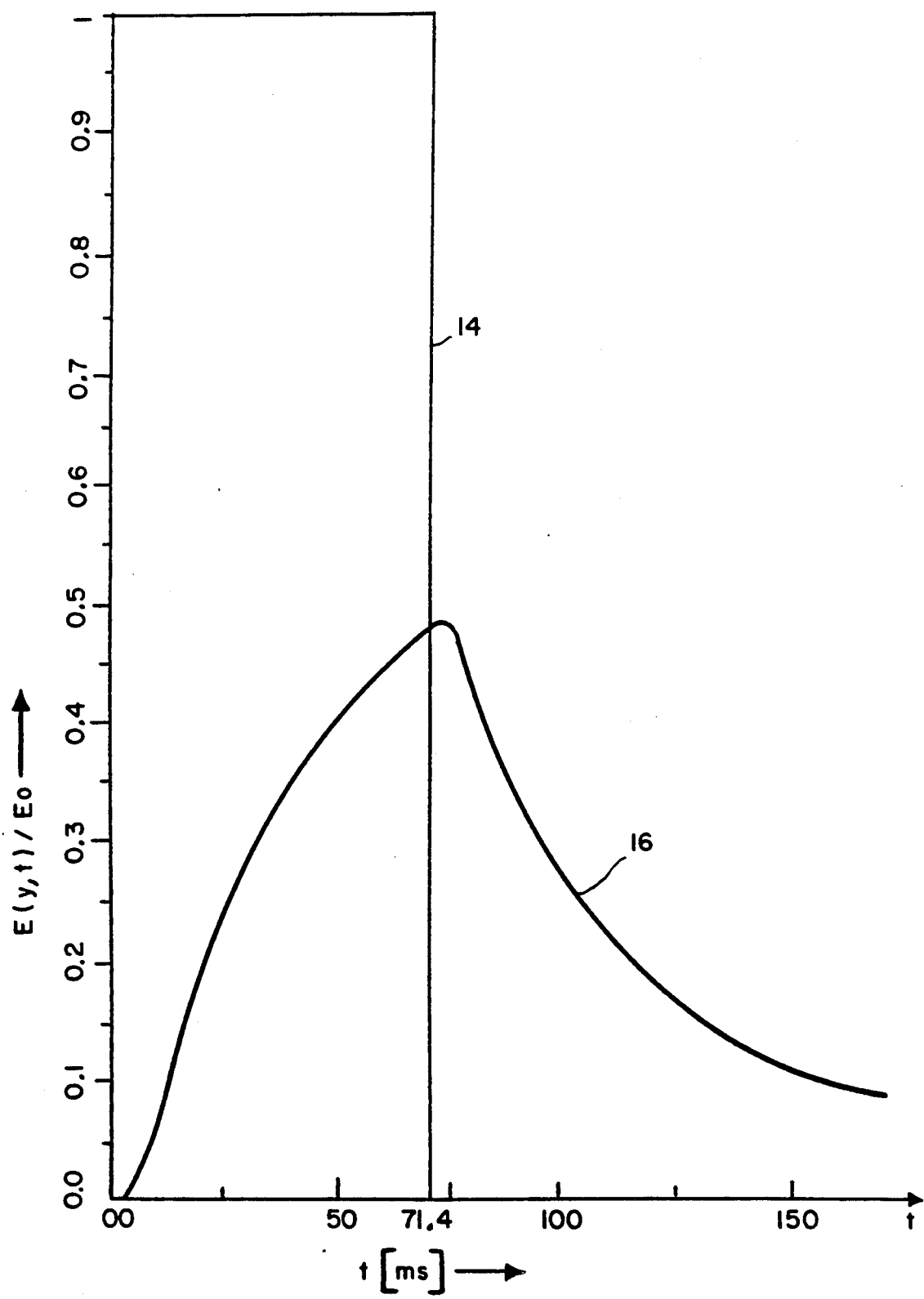
FIG. 2 shows the time diagram of a radar system which radiates a long rectangular pulse with amplitude $E_0$ and duration T=71.4 ms, as required to penetrate media with large losses, superimposed on the "distorted pulse" of amplitude of about $E_0/2$ which results after the transmitted pulse propagates through 1.1 km of seawater.
Figure 3:
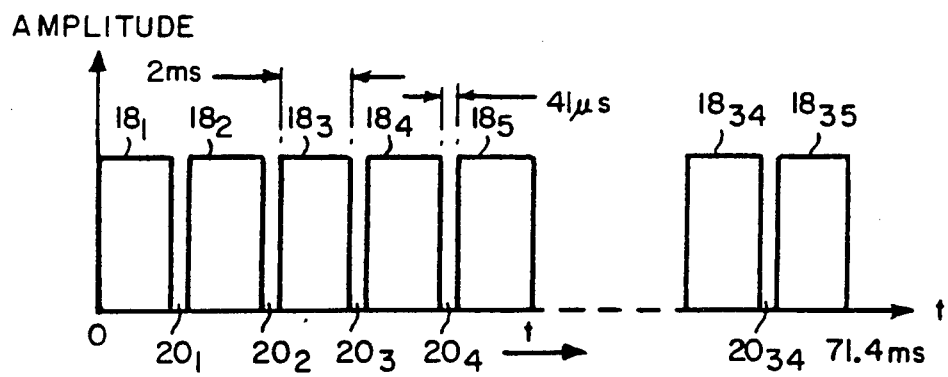
FIG. 3 is a time diagram showing the 71.4 ms long rectangular pulse of FIG. 2 replaced by 35 pulses of duration 2 ms each, with an interval of 41 μs between the pulses.

In order to receive the distorted pulse in FIG. 2 at any time t>0, one can interrupt the radiation periodically as shown in FIG. 3. It is evident that the short intervals $20_i$ without radiation cannot have a significant effect on the distorted pulse of FIG. 2. Hence, the one rectangular pulse 14 of FIG. 2 can be replaced by the 35 rectangular pulses $18_1$–$18_{35}$ of FIG. 3. During the interval of interruption one can receive a returned pulse. There are 34 such interruption intervals $20_1$–$20_{34}$ shown in FIG. 3 during the time 0<t<71.4 ms of the radiated pulse. This implies that 34 samples of the distorted pulse 16 in FIG. 2 can be received during the time 0<t<71.4 ms. This number of samples is ample to define the time variation of the distorted pulse. The signal processing in a radar system is routinely done by computer, which implies that sampled functions are processed and decisions are based on these sampled functions. Thus, nothing is lost if the received field strength is sampled and the sampling starts at the input of the receiver rather than at a location further downstream.

The choice of 2 ms long pulses separated by 41 μs long intervals $20_i$ in FIG. 3 is highly arbitrary. The typical way to arrive at those numbers is to decide first how often one wants to receive a sample of the returned pulse or field strength; this determines the 2 ms in the present example. Then one has to decide how long it takes the receiver to recover from the saturation caused by the radiation of a pulse and to obtain a sample of the received field strength; also, some time filtering can be introduced at this occasion, for instance, in order to suppress an unwanted strong return signal from the surface of the Earth if the radar is some distance above the Earth. It is important that the duration of the intervals of interruption of the radiation be large enough that an unwanted signal returned from a layer between the radar transmitter/receiver and the objects of interest is suppressed. This leads to the 41 μs in the example. Obviously, both the duration of the pulses and the duration of the intervals between the pulses depend strongly on the current state of technology for the switching of powerful pulses and the recovery of sensitive receivers.

Figure 4:
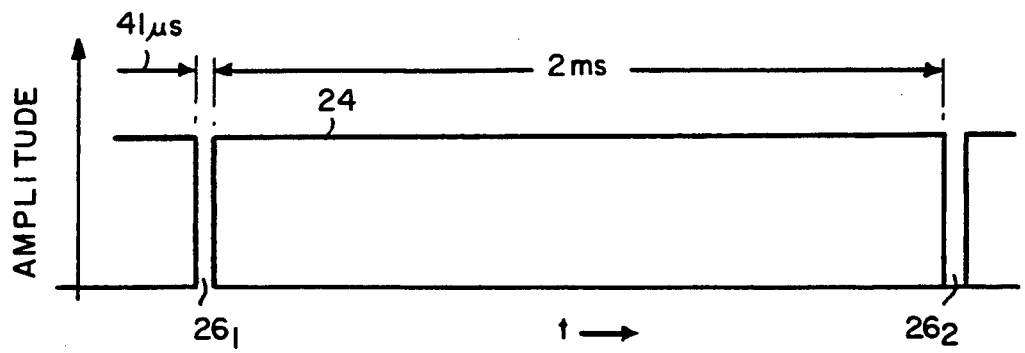
FIG. 4 is a time diagram showing the pulse of FIG. 3 and the intervals of 41 μs duration at its beginning and end, drawn to scale.

FIG. 4 shows a pulse 24 of duration 2 ms and the two intervals, $26_1$ and $26_2$ of duration 41 μs at beginning and end, drawn to scale. Since the gaps are only about 2% of the pulse duration and could be reduced to 1% or less, their effect on the time variation of the returned distorted pulse 16 in FIG. 2 is negligible.

It is important to recognize that this principle of providing intervals for reception as discussed here works only if the distorted pulse of FIG. 2 is to be received as a sampled function for any time $t>0$. The information about the distance this pulse has propagated must be derived from its time variation, not from a round-trip time that is difficult to define for lossy media and even harder to measure. A distance measurement based on round trip time and using 2 ms long pulses could not resolve anything at a distance of less than $2\times10^{-3}\times3\times10^8/2=3\times10^5 m=300$ km, if operating in air and about 30 km if operating through seawater or rock with similar values for conductivity, permittivity, and permeability.

Figure 1:
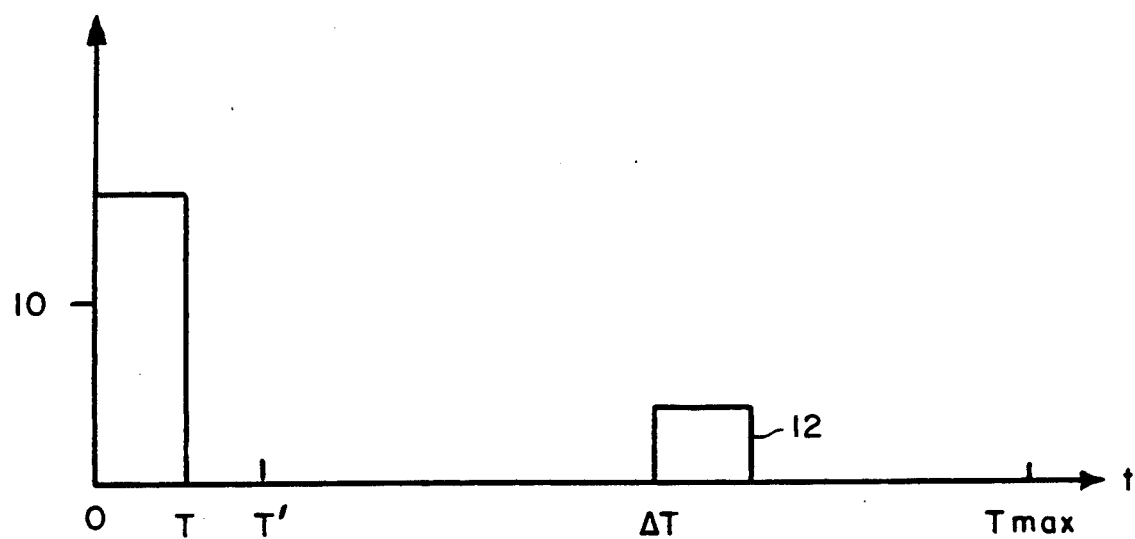
FIG. 1 shows the time diagram of a radar system which radiates a pulse during the time 0<t<T and receives an echo returned from a target at the time t=ΔT, for an essentially loss-free medium such as a vacuum or the atmosphere.
Figure 5:
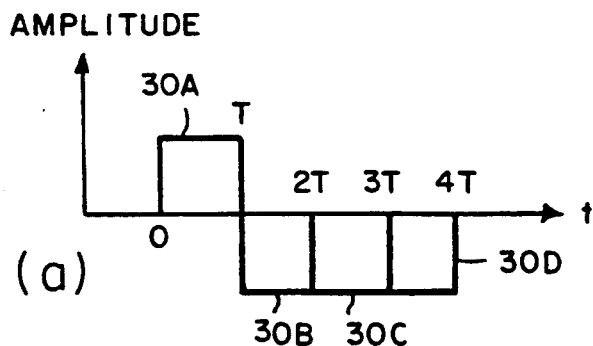
FIG. 5, part (a) is a time diagram of a sequence of pulses according to a so-called Barker code.
Figure 5:
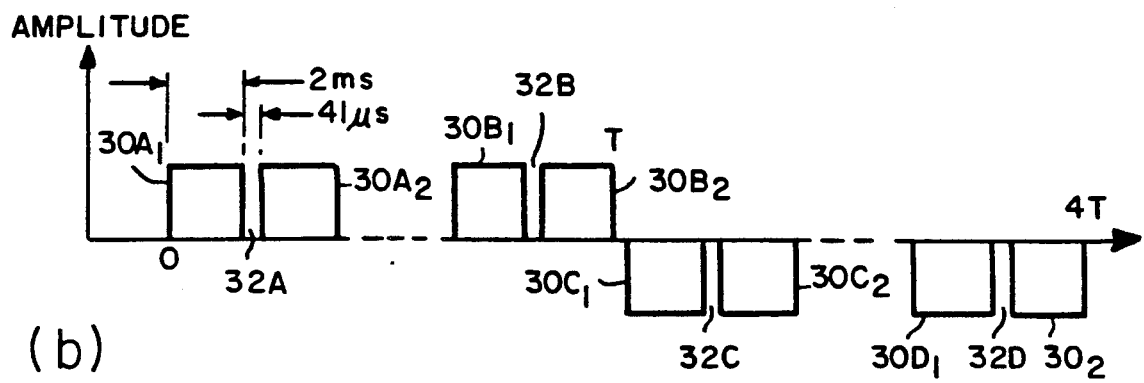

An actual radar system, even if operated as carrier free radar, as is usual for probing radars that look down into the ground or water, rather than up into the atmosphere, does not usually send out a pulse like the radiated pulse in FIGS. 1 and 2. It usually would emit sequences of pulses. Such sequences permit signals coming from different radars to be distinguished—each one using a specific pulse sequence that is as characteristic for a particular radar as the carrier frequency is for a radar using a sinusoidal carrier—but they also permit more energy to be put into a signal without increasing the peak power or reducing the range resolution. A simple sequence of four pulses 30A–30D, known as a Barker code, is shown in part (a) of FIG. 5. The same pulse sequence, but each pulse replaced by 2 ms long pulses (e.g., $30A_1$ and $30A_2$ replace pulse 30A) with 41 μs long gaps (32A–32D) between them, is shown in part (b) of FIG. 5. It is evident that the principle of inserting short gaps can readily be applied to pulse sequences. This permits use of sequences of pulses that characterize the radar transmitter that produces them and that permit more energy to be put into the signal without increasing its peak power.

What is claimed is:

1. A method for probing an absorptive medium to establish a range to a target using a radar pulse that is long relative to the arrival of echo information from the target, comprising the steps of:
    a. using a radar transmitter, radiating a radar signal into the medium for a duration T;
    b. interrupting said radiation for a multiplicity of intervals of interruption with a total time that is short relative to the duration T of the radiated signal; and
    c. using a radar receiver, receiving samples of a returned signal during these intervals.

2. The method of claim 1 wherein the duration of each of said intervals of interruption of the radiation is so small relative to said duration T that a returned pulse is essentially unaffected by the interruption of the radiation.

3. The method of either claim 1 or claim 2 wherein the duration of the intervals of interruption of the radiation of said radar signal is long enough to allow the receiver to recover from an unwanted signal returned from a location between the radar receiver and an object of interest.

4. The method of claim 1 wherein the radiated radar signal is a sequence of positively-going and negatively-going pulses of duration T that form a distinct pattern which characterizes the radar transmitter that produces them.

5. A method for probing an absorptive medium using a radar pulse that is longer than the time when echo information starts to arrive, comprising the steps of:
    a. using a radar transmitter, radiating into the medium, a signal comprising a sequence of pulses of overall duration T, by radiating a plurality of shorter pulses, each of duration less than T, with each pair of sequentially adjacent shorter pulses being separated by an interval of non-transmission, called an interval of interruption, the interval of interruption being of short duration relative to duration T, the duration of each interval of interruption being sufficient to allow a radar receiver to receive and properly process a sample of any returned signal; and
    b. using a radar receiver, receiving samples of a returned signal during said intervals of interruption.

6. The method of claim 5 wherein the pulses of duration T are positively and negatively-going in a distinct pattern which characterizes the radar transmitter that produces them.

7. The method of claim 1 or claim 5 wherein the intervals of interruption are optimally positioned within the interval of duration T for reception of wanted signal.

8. A radar system comprising:
    a transmitter including
        1) means for generating a signal that is long relative to the arrival of echo information, comprising a plurality of pulses of duration T, each plurality of pulses being inclusive of a multiplicity of non-transmission intervals that occur during said plurality of pulses, each such non-transmission interval being short relative to duration T, and
        2) means for radiating said signal into an absorptive medium; and
    receiving means for receiving a returned signal from the absorptive medium during said non-transmission intervals.

9. A radar system comprising:
a transmitter including
1) means for generating a multiplicity of short pulses,
2) means for combining said multiplicity of short pulses into a sequence such that consecutive pairs of said pulses are temporarily separated from each other by an interval that is short relative to each pulse, and
3) means for radiating said sequence of short pulses into an absorptive medium for a duration T which includes a plurality of said short pulses; and
receiving means for receiving a signal returned from the absorptive medium during said intervals without a pulse.

10. The method of claim 3 wherein the unwanted signal is returned from a boundary layer between the radar receiver and an object of interest.